May 15, 1962 H. W. HESTER 3,034,276
ENDLESS CUTTING ASSEMBLY
Filed Oct. 22, 1959 2 Sheets-Sheet 1
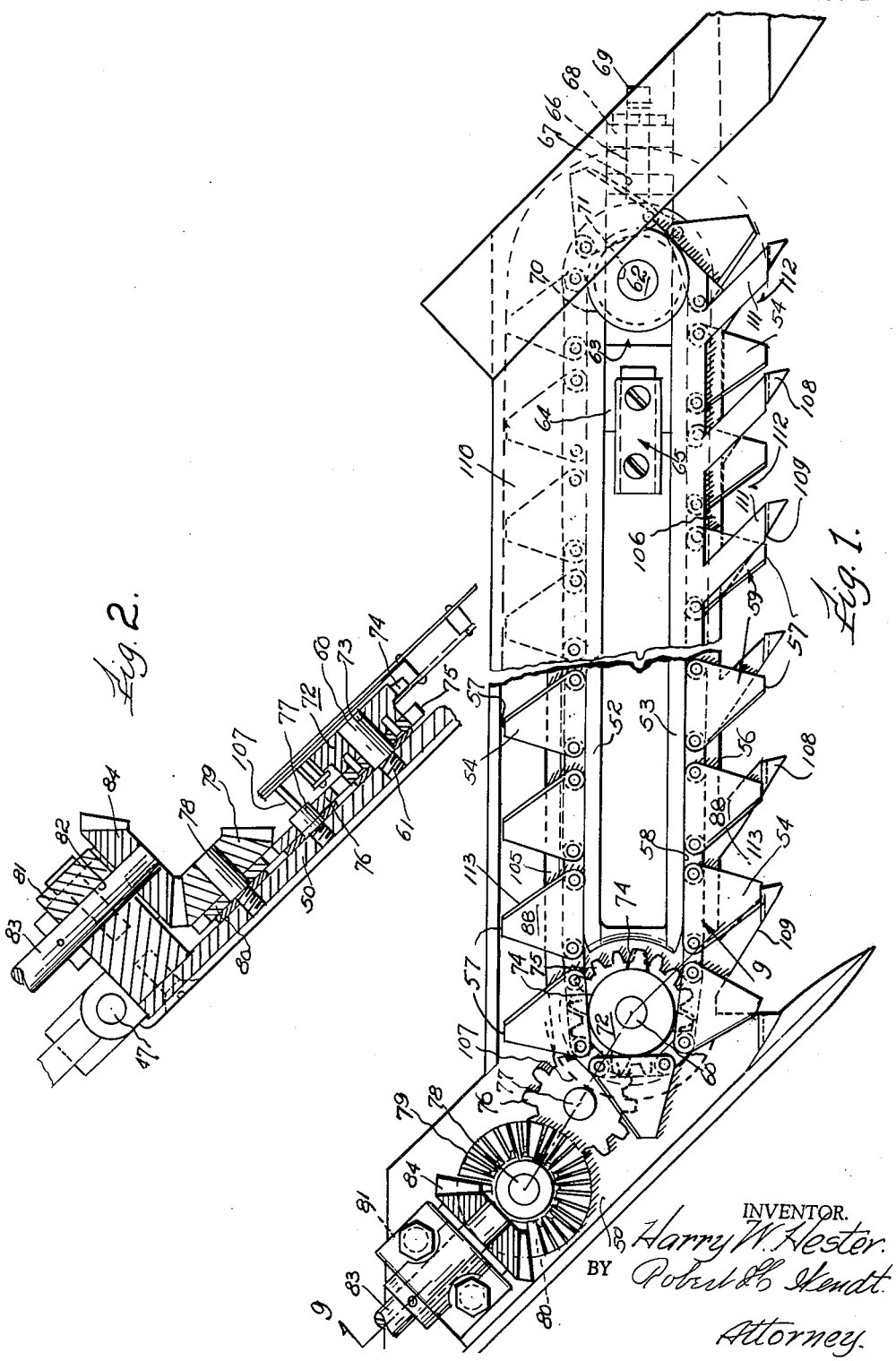
INVENTOR.
Harry W. Hester
BY Robert H. Hendt
Attorney

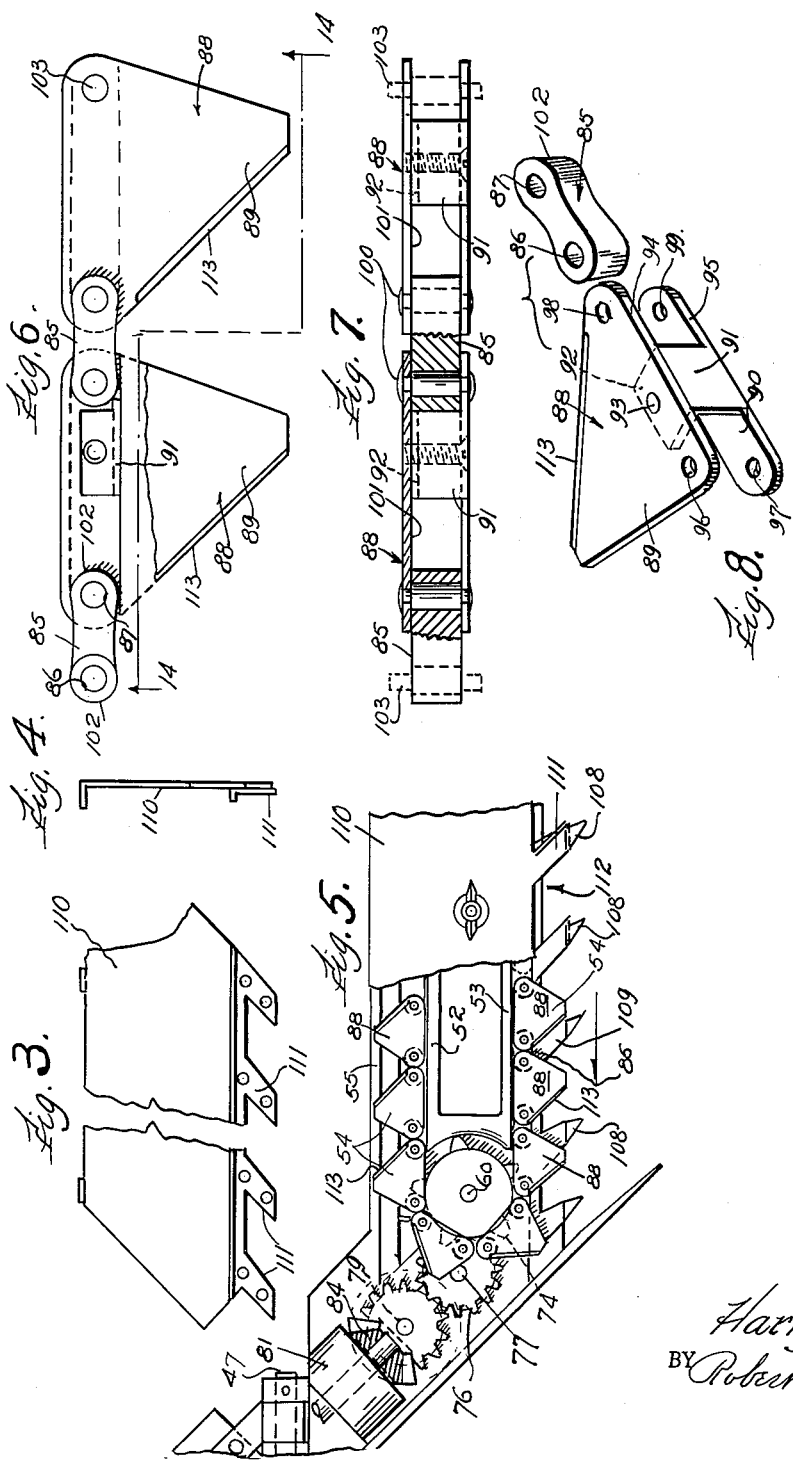

United States Patent Office 3,034,276
Patented May 15, 1962

3,034,276
ENDLESS CUTTING ASSEMBLY
Harry W. Hester, Chenoa, Ill., assignor of one-half to Robert H. Wendt
Filed Oct. 22, 1959, Ser. No. 848,097
6 Claims. (Cl. 56—291)

The present invention relates to tractor driven mowers, and is particularly concerned with mowers of the type adapted to be mounted in front of a tractor in such manner that mowing may be accomplished far into the corners of the field and a turn effected without driving over the unmowed grain or hay.

One of the objects of the invention is the provision of an improved mower having a forward mounted sickle bar which is so arranged that the mower can cut cleanly into the corner of a field without knocking down any uncut grain or hay.

Another object of the invention is the provision of an improved tractor driven mower which has its sickle bar so arranged that it will cut the grain up to the fence in a corner and effect a turn of the sickle bar in a lateral direction at the corner in such manner as to cut the hay or grain cleanly in any corner.

Another object of the invention is the provision of an improved sickle bar construction which is adapted to eliminate the breakage of sickle bars, such as many farmers experience during use of the sickle bars of the prior art, which reciprocate at a high speed.

Another object of the invention is the provision of an improved sickle bar of the class described in which the blades always move in the same direction, and in which the blades are beveled backward so that they cut better; and there is no catching of the end of the blade on the guard.

Another object of the invention is the provision of an improved leger plate, sickle, and guard combination in which the cut is always effected between upper and lower supports for the blade of grass or stem of grain so that there is no tendency for the grass or grain to bend away from the blade; and the grass or grain may actually be entrapped between the leger plate, guard, and the sickle bar blade.

Another object of the invention is the provision of an improved detachable mounting for a mower of the class described on a tractor, including suitable hydraulic arrangements for lifting the mower and universal driving connections for driving the mower from the power take-off of the tractor.

Other objects and advantages of the invention will be apparent from the following description and the accompanying drawings, in which similar characters of reference indicate similar parts throughout the several views.

Referring to the drawings, of which there are two sheets,

FIG. 1 is a fragmentary top plan view of the sickle bar with the top plate removed;

FIG. 2 is a fragmentary sectional view taken on the plane of the line 9—9 of FIG. 1;

FIG. 3 is a fragmentary bottom plan view of the top plate;

FIG. 4 is a cross-sectional view of the top plate;

FIG. 5 is a fragmentary plan view of the sickle blade assembly with the cover removed;

FIG. 6 is a top plan view of a pair of assembled sickle blade members.

FIG. 7 is a sectional view taken on the plane of the line 14—14 of FIG. 6;

FIG. 8 is a view in perspective of a blade link and a connecting link.

The sickle bar assembly is pivotally mounted on the pin 47 so that it may ride upwardly over obstructions on the ground and conform in its level to the level of the terrain. The sickle bar assembly is preferably mounted upon a base plate 50.

The base plate of the sickle bar assembly has the upwardly extending ribs 52 and 53, forming the inner guides for the cutter blades 54, and the upwardly extending ribs 55 and 56, forming outer guides for the blade 54.

As there is no cutting to be performed on the rear side of the sickle bar assembly, rib 55 may be spaced far enough from the ends 57 of the blades so as to prevent them from projecting and to remove the hazard of cutting someone at this side of the assembly.

At the front of the sickle bar assembly the rib 56 is close enough so that with the rib 53 it forms a channel 58 for housing and guiding the chain blade assembly, indicated at 59, by means of which the blades are carried.

The base plate of the sickle bar assembly carries a fixed stub shaft 60 threaded into a threaded bore 61 at the left end of FIG. 8 and a second stub shaft 62 similarly attached to a sliding adjustment block 63 by means of which the spacing of the shafts 60, 62 may be varied to adjust the tension of the chain assembly 59.

The sliding block 63 is provided with a U shaped guide member 64, the legs of which slide upon a guide block 65; and similar guide blocks 65, 65 are located above and below the sliding block 63 to hold it in place.

A threaded member 66 has its end secured to the sliding block 63 by being threaded into an aperture 67 and has its shank extending through an upwardly projecting flange 68 so that the head 69 of the bolt 66 may be turned to move the block 63 toward the right or left in FIG. 8 to adjust the tension of the chain blade assembly.

The shaft 62 supports an idler wheel 70 having a bearing aperture 71 and having a circular periphery for engaging the inside of the chain blade assembly and supporting it at that end.

The shaft 60 supports a combined cog wheel and gear 72 having a bearing aperture 73 and having its upper portion provided with a rib carrying projecting lugs 74, which are tapered to be received between the link apertures of the chain assembly 59 to drive the chain blade assembly.

The lower part of the combined wheel and gear 72 has radially projecting gear teeth 75 adapted to be driven by the gear teeth on the gear 76, which is rotatably mounted on stub shaft 77.

Another stub shaft 78 is carried by the base plate 50 and rotatably supports a combined bevel gear 79 and spur gear 80 secured thereto so that the bevel gear 79 may drive the cog wheel 72.

The base plate 50 has an upwardly extending bearing block 81 with a bearing aperture 82 rotatably supporting the shaft 83, which carries the driving bevel gear 84 by means of which the assembly of gears is driven.

Referring to FIGS. 5–8, the chain-blade assembly includes the chain links 85, comprising solid links with a pair of spaced bearing apertures 86, 87; and the blade links 88, each of which includes a blade member 89 fixedly mounted upon a supporting member 90 having an angle arm 91 and an attaching flange 92 that is riveted to the blade at 93.

The blade itself has its inner edge 94 parallel to the edge 95 of the blade supporting member; and the blade and supporting member are provided with aligned apertures 96, 97 at one end and 98, 99 at the other end.

The spacing of the blade supporting member 90 from the blade is sufficient so that the links 85 may be inserted between them and pivotally secured by means of rivets 100, as shown in FIG. 14, to form a continuous closed chain.

The spaces shown at 101 between the successive links are wide enough to receive the teeth of the sprocket wheel by means of which the chain assembly is driven. The links 85 have rounded ends 102 for engagement with the teeth.

At one point in the chain assembly the pivotal connection may be by means of a removable pin and spacer 103 so that the chain can be taken apart.

Referring to FIG. 1, the chain assembly is given support beneath the blades by a pair of longitudinally extending ribs 55 and 56 located outside the chain, but underneath the blades, so that the blades slide on top the ribs 55, 56.

These ribs are also joined at the left end of FIG. 8 by a curved transverse rib 107 underneath the blades for supporting the lower side of the blades as they go around the cog wheel 72.

The bottom plate 50 is provided at its forward edge with the upwardly curved points 108 (FIG. 1) for riding up off the ground; and these points are carried by the diagonally extending teeth 109 on the bottom plate, which also carries a top plate 110, the body of which over-lies the chain assembly and is provided with the similar diagonally extending forward teeth 111.

The blades 88 being located between the bottom plate 50 and the top plate 110, as the sickle bar progresses forwardly, the straws of grass, grain or hay are caught in the spaces 112 between the upper and lower teeth, where the blades 88 act.

Thus the blades 88 act with their cutting edges progressing toward the left in FIG. 5, engaging the stems which are supported above and below so that they easily cut off.

The blades 88 have diagonally extending cutting edges 113 (FIG. 8) which slide across the stems that they are cutting, but do not tend to catch on the teeth 109 or 111.

The present sickle bar assembly is adapted to effect a clean cut by means of chain mounted blades, which always run in the same direction and thereby avoid the breakage that is incident to reciprocating bars. The grass or grain is caught between upper and lower teeth, while it is being engaged by the diagonal blades, thereby effecting a cleaner cut than any of the sickle bars of the prior art.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. A sickle bar assembly in which the blades move continuously in the same direction, comprising an elongated metal base plate for supporting the assembly, a shaft carried by each end of said base plate and projecting upwardly from said base plate, two chain wheels, each having a bore for receiving each shaft, and one being a cog wheel having peripheral chain receiving lugs, the other being an idler, one of said wheels being rotatably mounted on each shaft, an endless chain blade assembly comprising a succession of alternate chain links and blade links pivoted end to end to each other and mounted on the lugs of said cog wheel and the other wheel, an outwardly extending blade carried by each blade link, each blade having a diagonally extending cutting edge on its leading side with reference to the direction of movement of the blade links, a plurality of diagonally and forwardly extending base teeth carried by said base plate on its front edge, said base teeth being pointed forwardly and separated by wide vegetation receiving spaces, each base tooth having a rearward edge opposing the cutting edges of the blades and disposed at an angle to the direction of movement of the chain and the cutting edges of the blades being at such an angle with reference to the base teeth that the blade edge engages the tooth edge first at a point near the outer end of the tooth, entrapping vegetation between the cutting edge and the tooth behind said point.

2. A sickle bar assembly according to claim 1, including a top plate over-lying the chain and wheel assembly and having forwardly extending diagonal teeth similar in shape to the teeth on the base plate and engaging the entrapped vegetation above the blades as well as below the blades.

3. A sickle bar assembly according to claim 1, in which each blade link comprises an upper triangular blade flange secured to a yoke which carries a lower link flange, said link flange and blade flange having a pair of aligned pivot apertures at each end receiving and pivoted to a solid link at each end, leaving spaces between the solid links and yokes receiving the cog wheel lugs.

4. A sickle bar assembly according to claim 1, in which the teeth on the base plate are provided with upwardly curved bottom surfaces for engaging the ground and leading to the forward points and with plate top surfaces extending to backwardly open slots, in which the outer edges of the blades slide.

5. A sickle bar assembly according to claim 1, in which the base plate has upwardly extending guide ribs from cog wheel to idler wheel engaging and guiding the inner surfaces of the chain.

6. A sickle bar assembly according to claim 1, in which the base plate has upwardly projecting guide ribs with upper surfaces engaging below the blades and holding them parallel to the base plate as the blades slide on the guide ribs.

References Cited in the file of this patent

UNITED STATES PATENTS

| | | | |
|---|---|---|---|
| Re. 1,758 | Whiteley | Aug. 30, | 1864 |
| 22,824 | Persons et al. | Feb. 1, | 1859 |
| 263,409 | Hick | Aug. 29, | 1882 |
| 589,611 | Northern | Sept. 7, | 1898 |
| 677,095 | Nagel | June 25, | 1901 |
| 1,145,739 | Bartges | July 6, | 1915 |
| 1,851,840 | Huff | Mar. 29, | 1932 |
| 2,575,369 | Thornton-Trump | Nov. 20, | 1951 |
| 2,624,999 | Goodnight | Jan. 13, | 1953 |
| 2,629,219 | Hooley | Feb. 24, | 1953 |
| 2,714,280 | Baker | Aug. 2, | 1955 |